United States Patent Office 3,309,977
Patented Mar. 21, 1967

3,309,977
PHOTOGRAPHIC CAMERA WITH AUTOMATIC
FLASH EXPOSURE MECHANISM
Edgar Sauer, Stuttgart-Rohr, Willi Günther, Stuttgart-Mohringen, and Heinz Köppen, Stuttgart, Germany, assignors to Zeiss Ikon Aktiengesellschaft, Stuttgart, Germany
Filed Jan. 15, 1964, Ser. No. 337,813
Claims priority, application Germany, Jan. 16, 1963, Z 9,856
9 Claims. (Cl. 95—45)

This invention relates to improvements in photographic cameras and objectives, respectively, which are provided with an automatic flash exposure mechanism.

Photographic cameras and objectives respectively are known which are provided with several operating ranges, such as a flash exposure range, an operating range for a manual adjustment or a preselection of the diaphragm, an operating range for an automatic adjustment of the exposure, and which as a further improvement are provided in the flash exposure range with an automatically adjustable flash exposure mechanism by means of which the diaphragm aperture is formed automatically in dependence of the adjusted guide number and distance values so that the camera user is relieved of any photographic calculations.

For the purpose of adjusting the camera to the different operating ranges, there is provided a so called actuating ring on which are arranged a guide number scale for the flash exposure range and a diaphragm scale for the manual setting of the diaphragm and, furthermore, a mark for the operating range of the automatic flash exposure. This actuating ring is rotatably adjustable relative to a stationary index. A distance adjusting ring is expediently arranged adjacent said actuating ring so that its distance scale values may be positioned opposite the same stationary index. In order to assure the formation of a correct diaphragm aperture in each individual automatic operating range, there are provided pivotally mounted intermediate transfer elements which are arranged between the actuating ring and the distance adjusting ring, or between the scanning device for the pointer of the exposure meter and the diaphragm cage, respectively. These intermediate transfer elements combine and store the adjusted guide number and distance values, and the exposure value respectively, and feed these values into a diaphragm mechanism, as the case may be either in automatic diaphragms or in pressure actuated diaphragms, by direct engagement of the diaphragm control ring, or by arresting the rotation of the latter when it has been set into a reverse motion by the release of the camera. For a more detailed description of photographic cameras of this type, attention is called by way of example to United States Letters Patent No. 3,074,331 dated Jan. 22, 1963, and to Köppen and Günther's copending United States patent application Ser. No. 207,578, filed July 5, 1962.

It is an object of the invention to further develop and improve these earlier proposals. For this purpose the present invention is extended to and includes now complete interchangeable objectives which are equipped with a complete automatic flash exposure mechanism and an actuating ring such as is provided in the heretofore made known photographic cameras. Furthermore, the invention may also be applied to exchangeable objectives having different focal lengths, and also to objectives with variable focal length or so called zoom lenses which by means of a rotatable or slidable element may be adjusted selectively to different focal lengths.

When using an interchangeable lens or a zoom lens the difficulty arises that successful flash exposures can be made only under certain optical conditions. In objectives of rather small and rather great focal lengths, for instance 25 mm. and from 135 mm. and up, good flash pictures are no longer obtainable on the basis of the usually employed flash energies and also not for mechanical reasons. The user of a camera which is equipped for interchangeable lenses and/or for fixed or exchangeable zoom lenses may therefore make the mistake to make flash bulb exposures with objectives of the above-mentioned extreme focal lengths and such pictures will turn out to be a failure.

This aforementioned difficulty is overcome according to the invention in that on a photographic camera, an objective or a shutter, to which may be attached interchangeable lenses or zoom lenses or parts of lenses, respectively, means are provided to adapt the adjustability of the actuating ring to the mechanical-optical condition of the objective.

It is further possible to erroneously expect to set the diaphragm aperture on the actuating ring or to read the diaphragm value on this actuating ring, from the viewfinder, or the like, that is, diaphragm values which the lens just being in use is unable to furnish. For instance, according to a conventional lens, the manual diaphragm scale on the actuating ring and perhaps a diaphragm scale visible in a viewing opening and/or in the viewfinder may begin with the maximum aperture ratio 1:2 ($f$:2). The lens being used, however, has a maximum aperture ratio of 1:3.5. Therefore, an adjustability or readability of the diaphragm values $f$:2 and $f$:2.8, which are not available under these circumstances, could easily lead to errors.

In order to preclude any confusion or misleading, the invention provides at least one stop on the actuating ring, and at least one control member on the lenses or lens parts to be coupled with the camera. This control member is designed and arranged in such a manner and so cooperates with the stop or with one of the stops on the actuating ring that with or after the attachment of a lens not suitable for flash bulb exposures, or with or after the selection of a certain focal length on a zoom lens, respectively, the adjustment to the automatic flash exposure range on the actuating ring is made impossible, and the diaphragm adjusting and reading range, respectively, is limited to the light capacity of the lens used.

These and other objects of the invention will now be described with reference to the accompanying drawings, in which.

Figure 1:
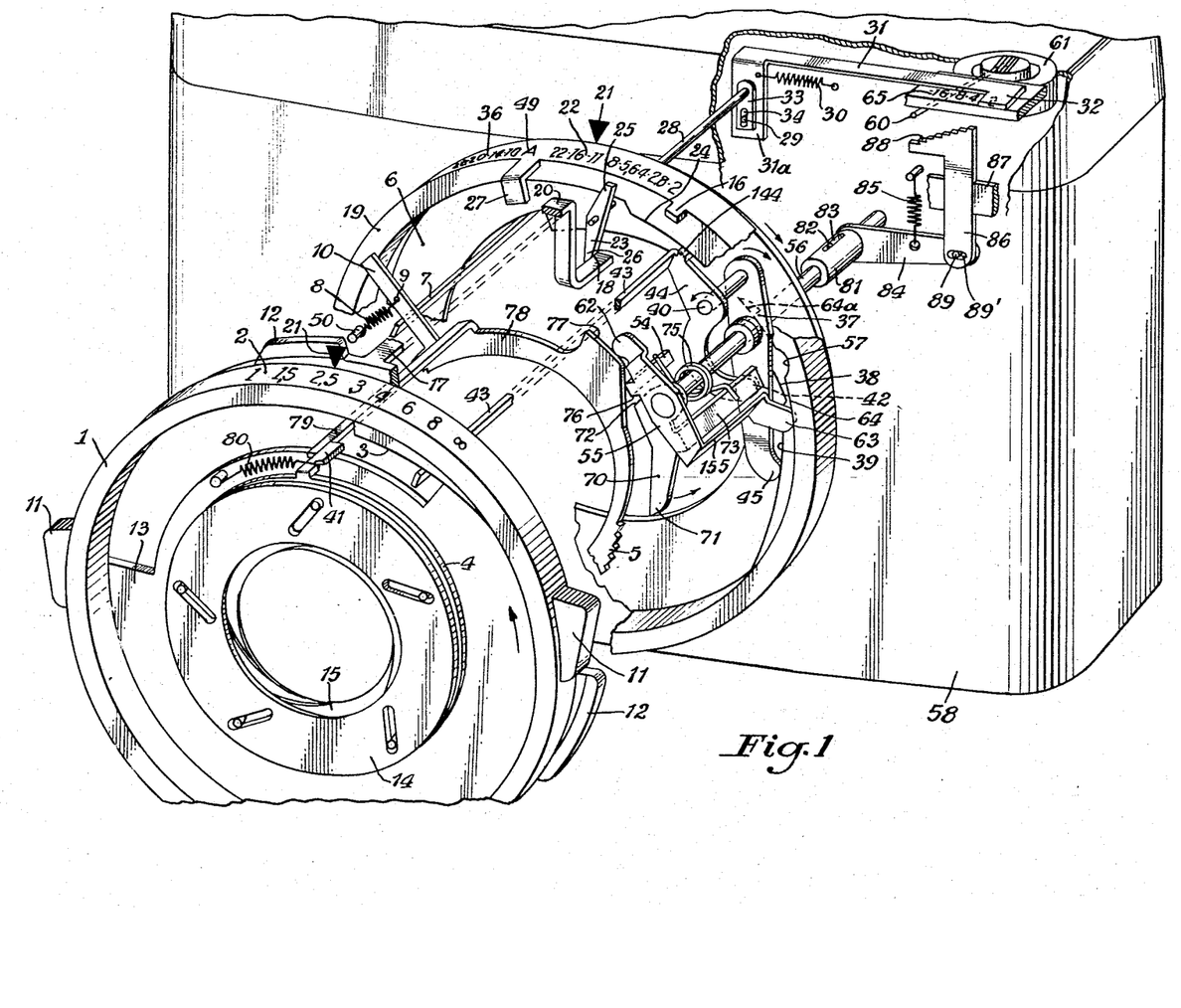
FIG. 1 illustrates diagrammatically in a perspective and an exploded view one embodiment of the invention, in connection with a photographic camera, a novel camera use limiting device.

In FIG. 1, the camera casing is designated with 58, while the numerals 1 and 19 refer to adjusting rings, namely the distance adjusting ring 1 and the actuating ring 19 for shifting the camera to the individual operating ranges. The distance adjusting ring 1 is arranged at the exchangeable lens member or the exchangeable objective, respectively, and has on its circumference a distance scale 2, while the actuating ring 19 is mounted rotatably adjustable on the camera and is provided with a guide number scale 36, a diaphragm scale 22 and a mark A49 which belongs to the automatic exposure mechanism. The distance adjusting ring 1 is further provided with adjusting handles 11, and 12 designates bayonet projections. A part of the lens mount of the exchangeable lens is designated with 13. There is further provided a common index 21.

The diaphragm mechanism arranged in the exchangeable member or in the exchangeable objective, respectively, is provided with a fixed diaphragm cage 14 and a rotatable diaphragm cage 4 effecting the opening and closing of the diaphragm segments 15. The diaphragm cage 4 is controlled in its adjustment by an intermediate ring 78 arranged on the camera casing, which ring 78 is connected with the diaphragm cage 4 by a coupling rod 79 extending parallel to the optical axis and engaging an abutment stop 41 on the diaphragm cage 4. A circumferentially extending spring 80 tends to rotate the diaphragm cage 4 in the direction of closing of the diaphragm segments, i.e. in counterclockwise direction. The intermediate ring 78 is also provided with a radial arm 10 which is engaged by a spring 8 fastened between a point 9 on the radial arm 10 and a fixed point 50. When the shutter is tensioned, the ring 78 against the action of the spring 8 is kept in a position which ensures a fully open diaphragm aperture by a shutter operated locking member 7 which upon release of the camera jumps into the position for permitting the diaphragm mechanism to make its return movement.

The distance adjusting ring 1 is provided on its inner circumference with a deflecting and compensating cam 3 which when small distances are adjusted projects rather pronounced toward the optical axis and becomes less steep when greater distance values are adjusted. The actuating ring 19 is provided at its inner circumference with a deflection cam 38 which corresponds to the guide numbers to be adjusted. That part of the cam 38 which projects more toward the optical axis corresponds to the higher guide numbers, while the more receding part of the cam 38 corresponds to the range of lower guide numbers.

These cams 3 and 38, respectively, are in cooperation with intermediate elements having the shape of scanning levers which register the adjusted distance and guide number in their rotative position and transfer these values to a control member which stores all adjusted and scanned values and upon camera release supplies these values to the diaphragm mechanism for the purpose of forming the required diaphragm aperture.

The deflecting cam 3 on the distance adjusting ring 1 engages a rod-like lateral projection 43 on the scanning lever 44 which carries a shaft 40 as its axis of rotation. The deflecting cam 38 on the actuating ring 19 engages a scanning lever 37 which has the shaft 56 as its supporting axis. The scanning lever 37 is rotatably mounted between its two ends and is so shaped that it has a lower end 45 which is able to cooperate with the cam 38 and that it carries at its upper end the shaft 40 on which the scanning lever 44 is supported.

As will be seen from the drawing, deflections of the scanning lever 37 caused by an adjustment of the ring 19 to a different guide number value result in a rotative movement of this lever 37 about the axis of the shaft 56 and in a displacement of the lever 44 because the rotative axis of this lever 44 is carried by the lever 37. If the lever 37, for instance, as a result of the adjustment of the ring 19 to another guide number performs a clockwise rotation, then the entire shaft 40 will be displaced the same direction. The lever 44, however, since it engages with its lateral scanning projection 43 the cam 3 on the ring 1 performs a movement in the opposite direction, i.e. counterclockwise. This means that the lower lever end 42 moves upwardly.

As stated before, the lateral projection 43 on the distance scanning lever 44 scans the distance adjusting ring 1 when the camera is adjusted to the range of the automatic flash exposure mechanism. If small distance values are adjusted, the scanning projection 43 in accordance with the deflection of the cam 3 is moved counterclockwise, namely in the direction toward the optical axis, and consequently the other lever end 42 moves upwardly. It will be noted that an adjustment to high guide numbers and small distance values will bring about a counterclockwise rotation of the scanning lever 44, while the adjustment of large distance values proceeding from the position as illustrated in the drawing will effect a clockwise rotation of the lever 44.

Owing to the fact that the axis of rotation of the scanning lever 44 is carried by the other scanning lever 37, the scanned values of both the guide number and the distance are stored in the lever 44. Strictly speaking, the position of the lever end 42 represents the sum of the adjusted guide number and distance values. Thus, the lever end 42 is qualified to control an adjusting member which in cooperation with the diaphragm mechanism determines the diaphragm aperture for the range of the automatic flash exposure.

The control of such an adjusting member by the lever end 42 is made possible in that the lever end 42 is engaged by a lateral arm 73 on a catch member 70 serving as an adjusting member for the diaphragm mechanism; this catch member 70 is provided at one of its ends with a tooth-like structure 71. The catch member 70 is loosely rotatably mounted on the same supporting shaft 56 which forms already the supporting axis for the likewise loosely rotatably mounted scanning lever 37. This supporting shaft 56 forms a part of the scanning device for the pointer position of the measuring instrument of the exposure meter which when the camera is adjusted for automatic exposure determines by means of the same catch member 70 the size of the diaphragm aperture. This scanning device consists essentially of two interconnected levers 84, 86 held together at one of their ends by a pin-slot connection 89, 89'. The vertically extending lever 86 is guided for vertical movement in a guide 87. The upper end of the lever 86 is provided with a series of abutment steps 88 which cooperate with the movable pointer 60 of the measuring instrument 61. A sleeve 81 on the shaft 56 carries the lever 84 and by a pin-slot connection 82, 83 is operatively connected with the shaft 56, even though the latter may move axially upon axial adjustment of the camera objective. A spring 85 engaging the lever 84 tends to pull the scanning device upwardly or to impart a counterclockwise rotation to the shaft 56, respectively.

The automatic exposure mechanism is further provided with a control lever 55 which is fixedly mounted between its ends on the shaft 56. This control lever 55 has a lower scanning end 63 on a rectangularly offset portion 155, an upper scanning end 62 and a lateral bearing lug 54 which is engaged by one end of a torsion spring 75 wound about the shaft 56. The other end of the torsion spring 75 bears against the lateral projection 73 of the catch member 70. This torsion spring 75 urges the lever end 62 against a radial cam-like projection 77 on the intermediate ring 78 which extends concentrically about the optical axis in the same manner as the other rings 1 and 19. As a result the lower lever end 63 is urged against the cam surfaces 64, 64a on the inner circumference of the actuating ring 19. Furthermore, the spring 75 via the coupling 73, 42 has the effect that the scanning projection 43 of the lever 44 is pressed against the cam 3 on the ring 1 and the scanning end 45 of the lever 37 is pressed against the cam 38 on the ring 19. Finally, the spring 75 also holds the catch tooth 71 of the catch member 70 in its operative direction toward the intermediate ring 78.

The intermediate ring 78 is provided with a series of abutment steps 5 with approximately radially arranged abutments. This series of steps 5 forms together with the catch member 70 a movement limiting device which permits the catch member 70 to limit the rotative movements forced upon it when the intermediate ring 78 is released and rotates rearwardly. If, for instance, the catch member 70 or its tooth-like end 71, respectively, is only a short distance away from the steps 5 as a result of the adjustment of the ring 1 to a large distance and of the ring 19 to a small guide number, the ring 78 and therewith the diaphragm cage 4, upon release of the camera, will be stopped in their return run already after a short distance, which means that the diaphragm was not able to close or to close only to an immaterial extent. If, however, the rings 1 and 19 respectively are adjusted to a high guide number and to a small distance value, then the catch tooth 71 will be positioned farther away from the steps 5. Thus, during the return movement one of the steps 5 will engage the catch tooth 71 only after a long rotative path and this results in the closing of the diaphragm down to a small aperture value.

As described previously, the lever end 63 of the control lever 55 engages the actuating ring 19 at its cam faces 64, 64a; between these circumferentially spaced surfaces 64, 64a is arranged a recess 57 into which the lever end 63 may drop. While the cam faces 64, 64a constitute the disconnecting surfaces for the automatic exposure mechanism, which are effective when either the automatic flash exposure range is operative or when the manual diaphragm setting range is operative, the recess 57 acts as a connecting cam for the automatic exposure mechanism. When the lever end 63 engages the recess 57, the previously effective blocking of the movement of the control lever 55 and the shaft 56 is eliminated.

It also has been pointed out before that the upper lever end 62 engages the cam-like projection 77 on the ring 78 which also results in a blocking of the scanning device, i.e. the shaft 56 and the elements 84 to 89. This blocking, however, takes place only in the tensioned condition of the camera. Upon release of the camera the ring 78 begins to rotate counterclockwise, the lever end 62 slides off the projection 77 and the lever 55 becomes freely movable. This means that when the camera is tensioned the scanning device 84 to 89 has no effect. The pointer 60 can swing freely and adjust to the position corresponding to the light conditions. Only upon a camera release the scanning device become operative, the lever 86 with the scanning steps 80 jumps upwardly and comes to rest in a position which depends on the position of the pointer. Obviously, there is provided a clamping device for the pointer which be-action and adjustment of the catch member 70 via the known, it is not illustrated. The scanning position of the scanning device results in a certain rotative position of the shaft 56 which in turn effects a corresponding action and adjustment of the catch member 70, via the coupling faces 72, 76.

For the purpose of manually adjusting the diaphragm, the diaphragm scale 22 is moved opposite the fixed index 21. The inner circumference of the ring 19 is provided with a disconnecting cam 39 which cooperates with the scanning head 45 of the lever 37. In adjusting the ring 19 to steadily smaller diaphragm aperture values, namely by rotating the diaphragm scale 22 from $f:2$ to $f:22$, the scanning head 45 moves along parts of the cam 39 which progressively project toward the optical axis so that the lever 37 performs a clockwise rotation about its shaft 56. The radius arc 24 on the actuating ring 19 which projects towards the optical axis serves for the cooperation with the scanning lever 44 in the range of the manual diaphragm adjustment or preselection, respectively. A lateral projection 144 at the upper end of the lever 44 engages this arc 24 and thereby provides a support for the lever 44. If now the lever 37 moves clockwise, the lever 44 on account of its mounting on the axis 40 and the support against the radius arc 24 moves counterclockwise which has the effect that the catch member 70, 71 resiliently engaging the lever 44 moves away from the series of steps 5. At a diaphragm aperture $f:22$ for instance the distance between catch member and steps 5 would be so great that an engagement of these two elements would take place only after a complete return run of the rotatable diaphragm cage 4, i.e., after the diaphragm segments 15 have been closed.

By the radius arc 24 it is made sure that the lateral projection 43 of the lever 44 which in the automatic flash exposure range cooperates with the deflecting cam 3 is moved away from this cam 3 so far that an influence of the selected distance on the formation of the diaphragm is not possible.

In exchangeable objectives or exchangeable objective parts which have such focal lengths that satisfactory flash pictures cannot be expected, the invention provides a means that becomes effective with or after attaching the objective or objective parts and which in cooperation with a stop on the actuating ring 19 prevents that the camera having the aforementioned objective can be adjusted to the automatic flash exposure mechanism by operating the actuating ring 19. Furthermore, said means has the effect that the diaphragm adjusting range on the actuating ring 19 is limited to the light capacity of the objective which is being used.

This means according to the invention as shown in the embodiment of FIG. 1 consists of a control member 17 which extends backwardly, i.e., toward the camera, and is provided with abutment faces 20 and 18. The actuating ring 19 is provided with a laterally and inwardly extending projection 27 acting as a counterstop. In addition, a further movable counterstop is provided in a stationary mount portion 6. This counterstop consists of a lever 23 which is rotatably mounted between its ends about a shaft 28. The ends of this lever 23 are designated with 25 and 26. Finally, the actuating ring 19 is provided with a lateral counterstop 16.

The projection 27 on the actuating ring 19 cooperates with the abutment area 20 of the control member 17 and is able to stop the flash exposure range (scale 36) on the actuating ring. The abutment area 18 of the control member 17 cooperates with the lower lever end 26 of the lever 23 and has the effect that this lever 23 in correspondence with the light capacity of the lens used is rotated clockwise. This upper lever end 25 which is in cooperation with the stop 16 on the actuating ring 19, with decreasing light intensity will be displaced more and more toward the right. Thereby takes places a displacement of the operating stop 25 of the lever 23 in a direction which is opposite to the direction of attachment of the objective (counterclockwise as shown by the arrow on 13) and therefore counteracts this attachment motion. With steadily decreasing light intensities the proper attachment or shape of the control member 17 or its face 18, respectively, will effect an increasingly wide rotation of the lever 23 and therewith an ever earlier engagement between the lever end 25 and the projection 16 so that large diaphragm aperture values can no longer be adjusted with the actuating ring 19.

In order for the diaphragm aperture indication in the viewfinder or in a viewing opening to meet the actual conditions, the invention according to FIG. 1 provides that a lever 33 having a slot 34 is attached to the shaft 28. A pin 29 attached to a lateral arm 31a on a slidable bar 31 extends into the slot 34. The bar 31 is subjected to the action of a spring 30 and is provided with a lateral vane 32 sliding and covering a diaphragm scale 65. When the shaft 28 rotates clockwise because of a decreased light intensity of the objective being used, the slidable bar 31 is moved toward the left and thereby the vane 32 will cover the large diaphragm aperture values, for instance as shown $f:2$.

The disclosure of the operation of the camera in its different operating ranges is based on the premises that objectives are employed which are suitable for making flash exposures. Here follows a description of the effect of the automatic limiting device according to the invention.

Upon a counterclockwise attachment of the exchangeable part of an objective or of a complete exchangeable objective to the camera casing, the coupling stops 41, 79 (FIG. 1) engage one another and the scanning projection 43 comes into engagement with the distance deflecting cam 3 on the ring 1.

When the camera is adjusted for automatic flash exposures, the scanning levers 44 and 37 conforming to the shape of the deflecting cams 3 and 38 are deflected. Hereby the counterclockwise rotation of the lever 44 which, as previously stated, combines the values of the deflections in its lever end 42, is the larger, the smaller the adjusted distance and the higher the adjusted guide number is. The upward movement of the lever end 42 resulting from this counterclockwise rotation causes a counterclockwise moving of the catch member 70 so that the catch tooth 71 moves more and more away from the series of steps 5. This means that upon release of the camera and return run of the ring 78 the engagement of the steps 5 and the catch tooth 71 takes a prolonged period of time so that a correspondingly small diaphragm aperture is being formed.

When the ring 19 is adjusted to long distances and low guide numbers, reverse deflections of the scanning levers 37 and 44 will take place. Both these scanning levers perform clockwise movements which result in a movement of the catch member 70 also in clockwise direction. The catch tooth 71 therefore is moved closely to the series of steps 5 so that already after a short return run it comes to an engagement between the tooth 71 and one of the steps 5 which means that the diaphragm has not been able to close at all or only to a small degree.

When the camera is adjusted for automatic flash exposures, all other operating ranges of the camera will be ineffective. The scanning device of the automatic exposure mechanism is locked in that the control lever 55 engages the cam faces 64 or 64a, respectively, on the ring 19 and is therefore ineffective. The shaft 56 thus serves only as a supporting axis for the scanning lever 37 and the catch member 70.

If the camera is now adjusted for using the range of the automatic exposure mechanism by moving the mark A49 opposite the index 21, then the lever end 63 of the control lever 55 will drop into the recess 57 on the ring 19 and the control lever 55 along with the shaft 56 and the scanning device 84 to 89 are ready for action. As long as the camera is tensioned, the just mentioned parts will remain inactive because the other lever end 62 of the lever 55 still engages the cam 77 on the ring 78. Only upon release of the camera and the ensuing return run of the ring 78 in counterclockwise direction the lever end 62 will slide off the projection 77 and the scanning device 84 to 89 is able to operate in conformance with the power of the spring 85 and to cause one of the steps 88 to come into engagement with the deflected pointer 60 of the measuring instrument. The control lever 55 serves not only for connecting and disconnecting the automatic exposure mechanism but also for the immediate activation of the catch member 70 (touching surfaces 72, 76) and directs the catch member 70 into a position which corresponds to the position of the scanning device. After a shorter or longer return run of the ring 78 the catch tooth 71 will engage one of the steps 5 and the required diaphragm aperture is formed. During the retensioning of the camera the lever end 62 again slides upon the elevated cam face 77 and the connection between the pointer 60 and the steps 88 is interrupted.

When the camera is adjusted for manual diaphragm adjustment or preselection, respectively, by rotating the diaphragm scale 22 opposite the index 21, as illustrated in FIG. 1, the scanning end 45 of the lever 37 engages the deflecting cam 39, and the lateral projection 144 on the upper end of the lever 44 engages the radius arc 24 on the ring 19. As stated previously, the scanning lever 37 rotates clockwise as a result of the shape of the cam 39 when the ring 19 is progressively adjusted to smaller diaphragm values. Simultaneously, the lever 44 connected with the lever 37 by the shaft 40 performs a counterclockwise rotation about the lateral projection 144 which bears against the concentric surface 24. The catch member 70, 71 being resiliently connected with the lever 44 follows the movement of the coupling end 42 and by counterclockwise rotating about the shaft 56 moves away from the steps 5. It will be noted that the smallest adjustable diaphragm aperture of $f{:}22$ causes the catch tooth 71 to assume its largest distance from the steps 5, so that consequently upon release of the camera the intermediate ring 78 and the rotatable diaphragm cage 4 coupled with it are able to perform a complete return movement before it comes to an engagement between the catch tooth 71 and the last step of the series of steps 5. Thus the diaphragm is closed as far as possible.

Furthermore, by the sliding of the scanning projection 144 along the radius arc 24 the scanning end 43 of the lever 44 will be lifted away from the distance deflection cam 3 on the ring 1 to such an extent that the formation of the diaphragm aperture will not be influenced by the selected distance.

If an exchangeable lens member or a complete exchangeable objective is used which possess or effect such an extremely small or extremely large focal length that satisfactory flash exposures are not obtainable, then the inventive device consisting of the stop and limiting elements 17, 27, 16 and 23 will be attached to such a lens member or objective, respectively. This device not only prevents the adjustability of the actuating ring 19 to the range of the automatic flash exposure, but it also has the effect that the diaphragm adjusting range on the ring 19 is adapted to the light capacity of the lens being used, and that diaphragm scales appearing and being readable in other places of the camera are likewise correspondingly limited. The control lever 17 is arranged on the lens, namely on its stationary mount portion 13 which also carries the bayonet projections 12. The control member 17 is so attached and shaped that with or after its attachment to the camera it has such a distance from the counterstop 27 on the actuating ring 19 that any adjustment of the guide number scale 36 to a position opposite the index 21 is impossible. In attempting to rotate the actuating ring 19 toward the right, the part 20 of the control member 17 will strike the abutment surface of the counterstop 27 so that a rotation beyond the automatic exposure range is no longer possible. The camera user is therefore protected from taking flash pictures with a lens not suited for making flash exposures so that the pictures will turn out defective.

With the attachment of the lens the abutment face 18 on the control member 17 has taken hold of the lever end 26 of the lever 23, and the latter is clockwise rotated about the axis of the shaft 28, which is mounted in the mount portion 6, in such a manner that the lever end 25 has assumed a predetermined distance from the stop 16 on the actuating ring 19. This distance is a measure for the light intensity of the lens being used. The smaller the light intensity, the closer the stops 25, 16 will be together and this effects a limitation of the extent of the adjusting range of the actuating ring 19. Large diaphragm aperture values of for instance $f{:}2$ and $f{:}2.8$, which cannot be employed in connection with the lens being in use, can no longer be placed into registration with the index 21, since the stops 25, 16 will prevent a further rotation.

During the clockwise rotation of the shaft 28 a corresponding rotative movement of the lever 33 attached to the shaft 28 has taken place and the pin 29 on the slidable bar 31 engages the slot 34 in the lever 33. A clockwise rotation of shaft 28 and lever 33 corresponds to a taking along of the bar 31 toward the left against the action of the spring 30 so that the scale values for the large diaphragm apertures on the scale 65 are covered up by the vane 32.

In connection with FIG. 1 it has been pointed out that the limiting device consisting principally of the lever 23 effects a reversal of movement with respect to the direction of attachment of the exchangeable lens member or exchangeable lens, respectively, to the camera. The direction of attachment has been presumed as being counterclockwise, while the lever 23 performs a clockwise movement.

Figure 2:
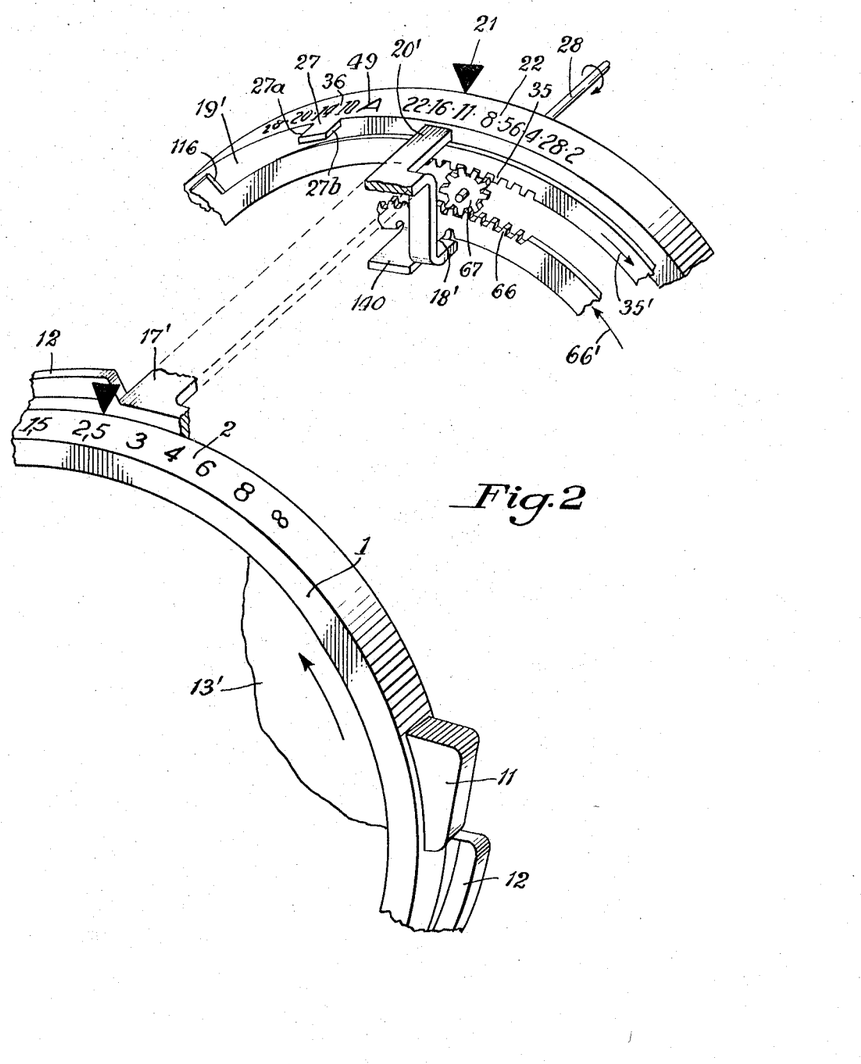
FIG. 2 illustrates a portion of FIG. 1, but a somewhat different camera use limiting device.

The embodiment of FIG. 2 discloses a different camera use limiting device which, however, also operates on the basis of reverse movement. This modification of the limiting device consists of the following parts: Adjacent and inside of the actuating ring 19' is provided a concentric gear wheel 35 carrying a limiting stop 116. A second gear wheel 66 is arranged concentrically within the gear wheel 35 and is provided with a lateral lug 140. Both gear wheels 35, 66 are in mesh with the same pinion 67 which is mounted in the mount 6, as in the embodiment of FIG. 1. The pinion 67 may be mounted on the shaft 28 which is coupled as shown in FIG. 1 with the diaphragm scale cover device consisting of the slidable bar 31, the vane 32, and the diaphragm scale 65.

In the same manner as in FIG. 1, a control member 17' projects from the mount portion 13 of the exchangeable lens. This portion 13 also carries the bayonet projections 12' which project toward the actuating ring 19. The control member 17' of FIG. 2 is formed in such a manner that the spaced abutment faces 20' and 18' become effective in different planes. The lower face 18' cooperates with the lug 140 on the gear wheel 66, while the abutment face 20' cooperates with an abutment face 27b on a lateral projection 27 provided on the actuating ring 19'.

This projection 27 on the actuating ring 19' is so shaped and arranged that the abutment face 27b which cooperates with the abutment face 20' on the control member 17', effects a blocking of the guide number adjusting range 36 on the actuating ring 19', while another abutment face 27a cooperates with a radial projection 116 on the gear wheel 35 and effects the limiting of the diaphragm adjusting range 22 on the actuating ring 19' in dependence of the light capacity of the lens being used. The operation is as follows.

When the exchangeable lens member or objective, respectively, is attached to the camera by a counterclockwise motion (direction of the arrow on part 13'), the gear wheel 66 is likewise counterclockwise rotated by means of the control member 17' and the abutments 18', 40 which are in engagement with each other. This counterclockwise motion of the aforementioned parts brings about a clockwise rotation of the pinion 67 together with the shaft 28 and also of the gear wheel 35. The individual directions of movement are indicated by arrows 66' and 35', respectively. After attaching and locking the lens, the abutment face 20' of the control member 17' has moved such a distance away from the projection 27 that when the actuating ring 19' is rotated, an adjustment of the same to a guide number of the scale 36 is prevented as a result of its being stopped by the abutment face 27b of the projection 27. Furthermore, the clockwise rotation of the gear wheel 35 has caused its radial projection 116 to be positioned at such a distance from the abutment face 27a of the projection 27 on the actuating ring 19' that when this ring is rotated an adjustment limitation of the diaphragm scale range 22 in conformance with the light capacity of the used lens is obtained. A cover device coupled with the shaft 28 and intended for the diaphragm scale 65 is of the same construction as disclosed in connection with FIG. 1.

Figure 3:
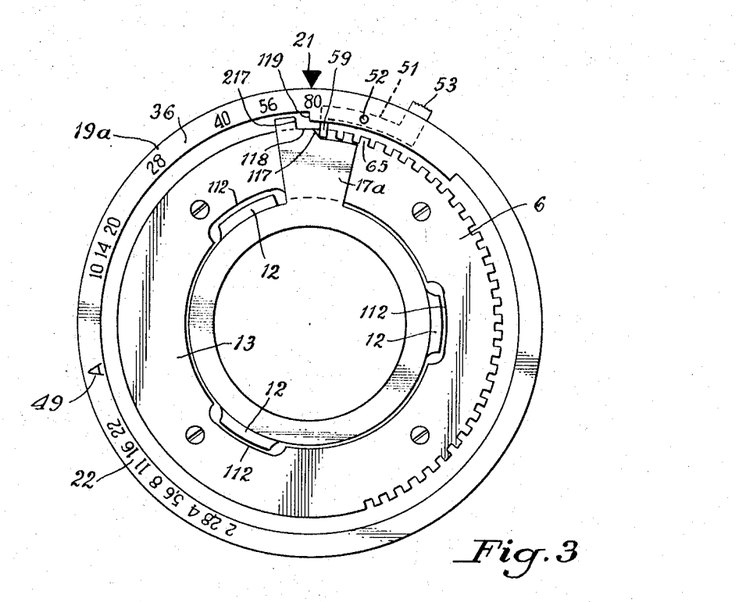
FIGS. 3 and 3a show each in different positions views of a modified camera use limiting device.
Figure 3A:
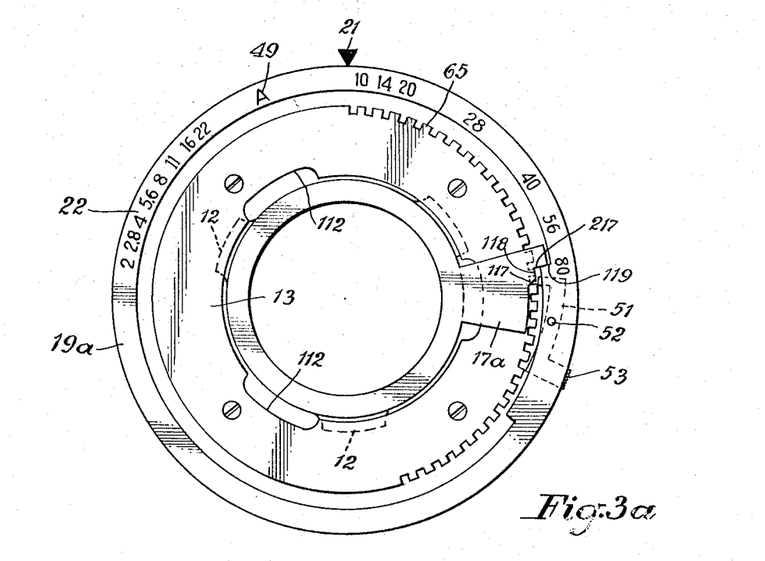

The FIGS. 3 and 3a illustrate a special modification of a control member 17a which makes it possible that a locking device acting between the actuating ring 19a and the mount portion 6 is rendered ineffective when the exchangeable objective is attached. This locking device consists of a lever 51 extending circumferentially along the ring 19a and pivotally supported between its ends about an axis 52. This lever 51 is provided at one end with a handle 53 and with a locking tooth 59 at its other end. This locking tooth 59 meshes with gear teeth 65 on the mount portion 6. In order to render this locking device ineffective, the control member 17a is provided with a concentric cam face 118 having an inclined face 117 at one end. In order to render the adjustment of the ring 19a to the automatic flash exposure range impossible when improper lenses are used, the control member 17a is also provided with a radial abutment face 217 which cooperates with a counter abutment face 119 on the actuating ring 19a. Again, the bayonet projections 12 on the exchangeable lens mount engage corresponding recesses 112 of the mount portion 13. FIG. 3 shows the position of the individual parts at the moment of the attachment of the lens, and FIG. 3a shows the position of these parts after the attachment of the lens.

As clearly illustrated in both FIG. 3 and FIG. 3a, the locking lever 51 is lifted out of the gear teeth 65 by means of the inclined face 117 and is retained in its ineffective position by moving up onto the cam face 118. When the exchangeable lens is attached, which in this particular embodiment of the invention is done by a clockwise rotation, the abutment face 217 of the control member 17a strikes against the counter abutment face 119 of the ring 19a and takes the ring 19a along whereby the entire circumferentially extending range of the guide number scale 36 is swept over. After completing the attachment (FIG. 3a), the index 21 is so positioned with respect to the actuating ring 19a that the last value of the guide number scale 36 is outside of the indication range. It is not possible either to adjust any value of the guide number scale 36 because such an adjustment is prevented by the abuting faces 217 and 119.

Figure 4:
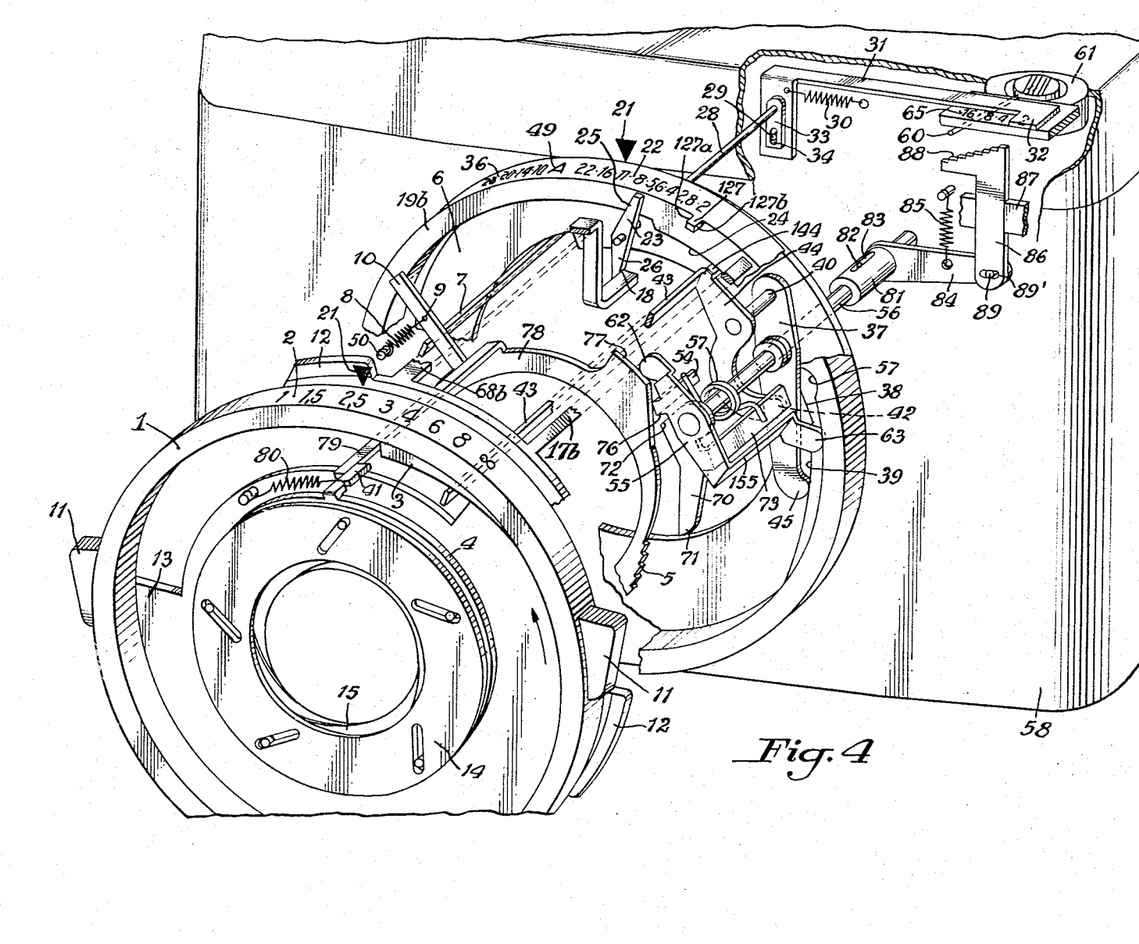
FIG. 4 illustrates a modified arrangement of FIG. 1.

The embodiment of the invention according to FIG. 4 differs from the embodiment of FIG. 1 in that the mount portion 13 of the lens is provided with two control members 17b and 68b of which the control member 17b effects the locking of the automatic flash exposure range and the control member 68b serves for limiting the diaphragm adjusting range in accordance with the light capacity of the lens which is being used. The actuating ring 19b is merely provided with a counterstop 127, one face 127b of which cooperates with the control member 17b and the other face 127a cooperates via the lever 23 with the limiting control member 17b. After the lens has been attached, the control member 17b is positioned from the abutment face 127b at such a distance that a rotation of the actuating ring 19b in clockwise direction beyond the mark A49 is no longer possible; the lever 23 has been clockwise rotated by the control member 68b to such a degree that the actuating ring 19b is limited in its movability with respect to the largest possible diaphragm apertures. Otherwise, the modification shown in FIG. 4 comprises the same parts and functions as the embodiment illustrated in FIG. 1 and also the direction of attachment is presumed to be counterclockwise.

Figure 5:
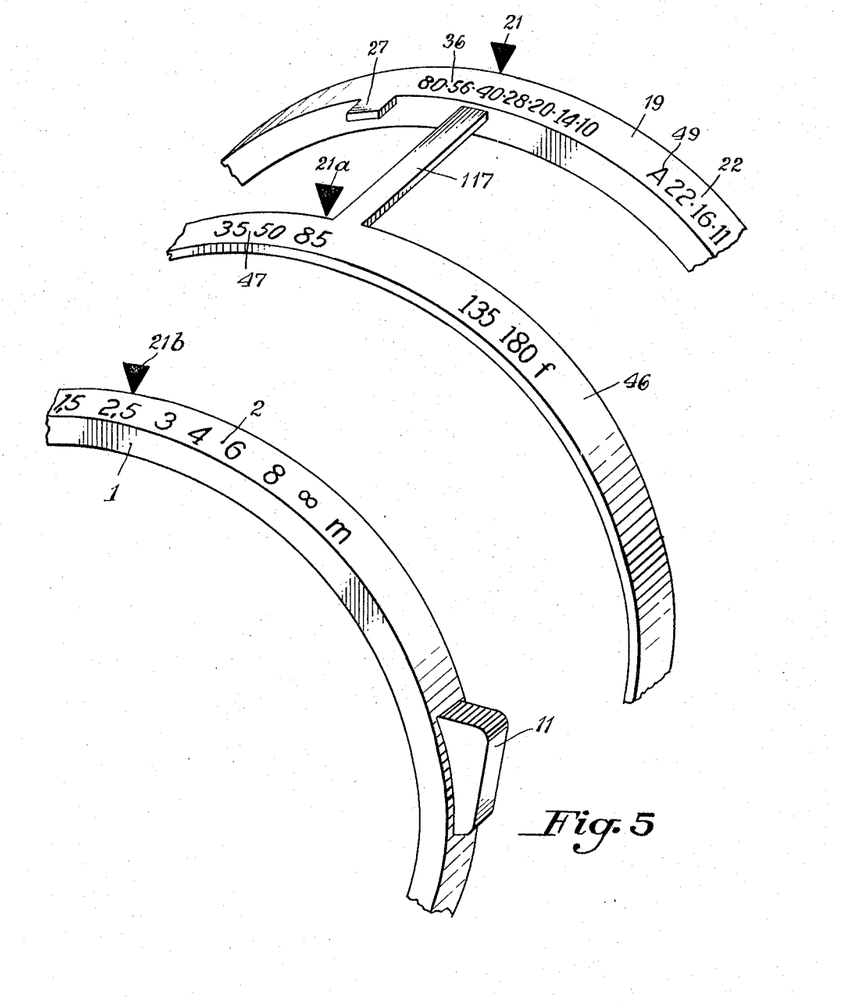
FIG. 5 illustrates a novel camera use limiting device for use with a camera objective having a variable focal length.

The modification of the invention as illustrated in FIG. 5 is based upon the use of an objective having a variable focal length, a so called zoom lens, which is provided with an adjusting ring 46 for producing different focal lengths. The focal lengths scale is designated with 47 and shows by way of example focal lengths of 35 mm., 50 mm., 85 mm., 135 mm. and 180 mm. The individual indices for the scales of the actuating ring 19, the focal length adjusting ring 46 and the distance adjusting ring 1 are intentionally illustrated in this figure for the sake of a clear understanding as being axially spaced and are designated with 21, 21a and 21b, but these indices may be combined to a single index 21 when in actual practice these adjusting rings are arranged close to one another.

The focal length adjusting ring 46 is provided with a lateral control cam 117 which cooperates with a lateral abutment 27 on the actuating ring 19. As this example shows, focal lengths of from 35 mm. to 85 mm. are still permissible for flash exposures, while the large focal lengths of 135 mm. and 180 mm. are eliminated for making flash exposures. When it is attempted to use also these focal lengths for the automatic flash exposure range, the arm 117 engages the abutment 27 and this prevents a further adjustment of the ring 46. The indicated circumferential distance between the focal length of 85 mm. and of 135 mm. is merely due to the extension of the guide number scale range 36. This distance could be avoided by providing the actuating ring 19 on which the lateral abutment 27 is arranged merely with a single flash symbol, while the individual guide numbers would be adjusted on a separate ring.

When using very long focal lengths, it is advisable to preclude from adjustability also the mark A49 in addition to the guide number range, because focal lengths of such high values do not permit satisfactory automatic exposures. In such a case the abutments 17, 117 on one hand and the abutments 27, 119 and 127 on the other hand must then be positioned to each other in such a manner that the mark A on the ring 19 cannot be moved in registration with the fixed index 21.

What we claim is:

1. In a photographic camera provided with an objective having an adjustable diaphragm, a diaphragm aperture adjusting mechanism including means for preselecting the diaphragm aperture to be adjusted, an automatic exposure adjusting means, and an actuating ring extending concentrically about the optical axis of said objective for selectively adjusting the camera to a plurality of operating ranges, namely to a flash exposure range, an automatic exposure range and a manually adjustable diaphragm aperture range, the improvement comprising means for selectively attaching to said camera any one of a number of interchangeable objectives of different and variable focal lengths respectively, and means for adjusting the adjusting range of said actuating ring to the respective different and variable focal lengths of said interchangeable objectives including an arresting device operatively connected with said actuating ring, said interchangeable objective being provided with a control member thereon for rendering said arresting device ineffective, said control member having a cam thereon for a locking lever pivotally carried by said actuating ring and forming a portion of said arresting device away from its locking position when said interchangeable objective is attached to the camera (FIG. 3).

2. In a photographic camera provided with an objective having an adjustable diaphragm, a diaphragm aperture adjusting mechanism including means for preselecting the diaphragm aperture to be adjusted, an automatic exposure adjusting means, and an actuating ring extending concentrically about the optical axis of said objective for selectively adjusting the camera to a plurality of operating ranges, namely to a flash exposure range, an automatic exposure range, and a manually adjustable diaphragm aperture range, the improvement comprising means for selectively attaching to said camera any one of a number of interchangeable objectives of different and variable focal lengths respectively, and means for adjusting the adjusting range of said actuating ring to the respective optical properties of said objectives, said last named means comprising at least one abutment means provided on said actuating ring and a control member provided on said interchangeable objective, said control member being so constructed and arranged as to cooperate with said abutment means on said actuating ring to prevent an adjustment of the actuating ring to said flash exposure range, when the focal length of a selected interchangeable objective attached to the camera is not suitable for making satisfactory flash exposures, in which the abutment means for preventing the adjustment of the actuating ring to the flash exposure range when the attached objective is unsuitable for making satisfactory flash exposures includes a blocking projection 27 on said actuating ring 19 and a control member 17, 117 which is moved during the attachment of the objective to the camera and is adapted to engage said blocking projection.

3. In a photographic camera provided with an objective having an adjustable diaphragm, a diaphragm aperture adjusting mechanism including means for preselecting the diaphragm aperture to be adjusted, an automatic exposure adjusting means, and an actuating ring extending concentrically about the optical axis of said objective for selectively adjusting the camera to a plurality of operating ranges, namely to a flash exposure range, an automatic exposure range and a manually adjustable diaphragm aperture range, the improvement comprising means for selectively attaching to said camera any one of a number of interchangeable objectives of different and variable focal lengths respectively, and means for adjusting the adjusting range of said actuating ring to the respective optical properties of said objectives, said last named means comprising two abutments provided on said actuating ring, and including an additional displaceable abutment device mounted on a stationary mount portion, said interchangeable objective being provided with a control member which cooperates with one abutment on said actuating ring so as to prevent an adjustment of said ring to said flash exposure range, when the focal length of a selected interchangeable objective attached to the camera is not suitable for making satisfactory flash exposures in said range, said displaceable abutment device being actuated by said control member so as to cooperate with said other abutment on said actuating ring so that the adjustable diaphragm aperture range is limited to cover only the light intensity of the objective attached to the camera.

4. A photographic camera according to claim 3, in which said displaceable abutment device which limits the adjustable range of the diaphragm aperture is provided with means which render said abutment operative when the interchangeable objective is attached to the camera, said last named means comprising a lever 23 pivotally supported between its ends on a shaft 28 which is journalled in a fixed portion of the camera, one end 26 of said lever being engaged by said control member 17 on said objective to be actuated by the latter (FIGS. 1 and 4).

5. A photographic camera according to claim 3, in which said displaceable abutment device which limits the adjustable range of the diaphragm aperture is provided with means which render said abutment operative when the interchangeable objective is attached to the camera, means operatively connected with said displaceable abutment device for indicating visibly the diaphragm aperture range for which the attached objective may be used, said last mentioned means including a gearing 66, 67, 35 of which one gear 66 is engaged by an abutment 18' on said control member 17', whereby said one gear is connected by a pinion 67 rotating about a fixed axis with another gear 35 which has a projection 116 thereon adapted to engage a blocking abutment 27 on said actuating ring (FIG. 2).

6. A photographic camera according to claim 3, including a measuring instrument for an exposure meter provided with a movable pointer adapted to sweep over an indicating means comprising a diaphragm aperture scale, said displaceable abutment device 23, 33 to 35 also controlling means operatively connected with means adapted to cover a portion of said diaphragm aperture scale depending upon the diaphragm aperture of the interchangeable objective which is attached to said camera, so that only such portion of said diaphragm aperture scale is visible which corresponds to the possible diaphragm apertures of said objective.

7. A photographic camera according to claim 4, in which said displaceable abutment device includes a lever fixedly mounted on a shaft which is rotatably mounted in a stationary part of the camera, and means operatively connecting said shaft with a longitudinal slidable bar carrying a vane which is adapted to slide over said diaphragm aperture scale to limit the visible portion of the same.

8. In a photographic camera provided with an objective having an adjustable diaphragm, a diaphragm aperture adjusting mechanism including means for preselecting the diaphragm aperture to be adjusted, an automatic exposure adjusting means, and an actuating ring extending concentrically about the optical axis of said objective for selectively adjusting the camera to a plurality of operating ranges, namely to a flash exposure range, an automatic exposure range and a manually adjustable diaphragm aperture range, the improvement comprising means for selectively attaching to said camera any one of a number of interchangeable objectives of different and variable focal lengths respectively, and means for adjusting the adjusting range of said actuating ring to the respective optical properties of said objectives, said last named means comprising a lateral lug with two abutment faces on said actuating ring, and including an additional displaceable abutment device mounted on a stationary mount portion, said interchangeable objective being provided with two control members of which one cooperates with one abutment face of said lug in such a manner that after attachment of an objective to the camera which is not suitable for making satisfactory flash exposures the adjustment of said actuating ring into its flash exposure permitting range (the range provided with a guide number scale) is prevented, whereupon said other control member actuates said displaceable abutment device so that the latter cooperates with the other abutment face of said lug on said actuating ring and causes the adjustable diaphragm aperture range to be limited to the light intensity of the objective attached to the camera.

9. In a photographic camera provided with an objective having an adjustable diaphragm, a diaphragm aperture adjusting mechanism including means for preselecting the diaphragm aperture to be adjusted, an automatic exposure adjusting means, and an actuating ring extending concentrically about the optical axis of said objective for selectively adjusting the camera to a plurality of operating ranges, namely to a flash exposure range, an automatic exposure range and a manually adjustable diaphragm aperture range, the improvement comprising means for selectively attaching to said camera any one of a number of interchangeable objectives of different and variable focal lengths respectively, and means for adjusting the adjusting range of said actuating ring to the respective focal lengths of said objectives, said actuating ring being provided with a single projection 127 having two abutment faces 127a, 127b while said interchangeable objective is provided with two control members 17, 68 of which one cooperates with one 27b of said two abutment faces for blocking the use of said flash exposure range, and that said other control member 68 cooperates with a displaceable abutment device 23 for limiting the camera to the specific diaphragm aperture range of the light intensity of the objective attached to the camera.

References Cited by the Examiner
UNITED STATES PATENTS

| | | | |
|---|---|---|---|
| 2,926,579 | 3/1960 | Gebele | 95—45 |
| 3,126,800 | 3/1964 | Maas | 95—10 |

JOHN M. HORAN, *Primary Examiner.*